H. L. SMITH.
STEERING WHEEL LOCK FOR VEHICLES.
APPLICATION FILED SEPT. 21, 1920.
1,423,632.
Patented July 25, 1922.
2 SHEETS—SHEET 2.
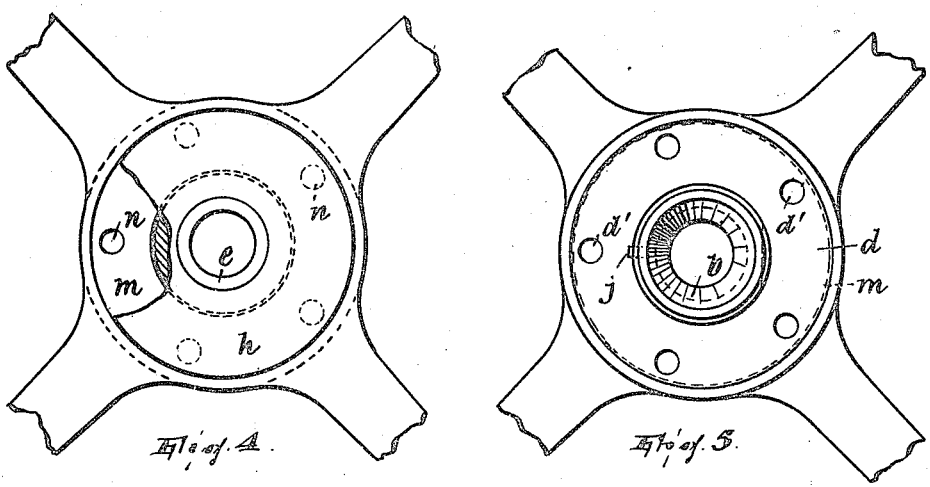
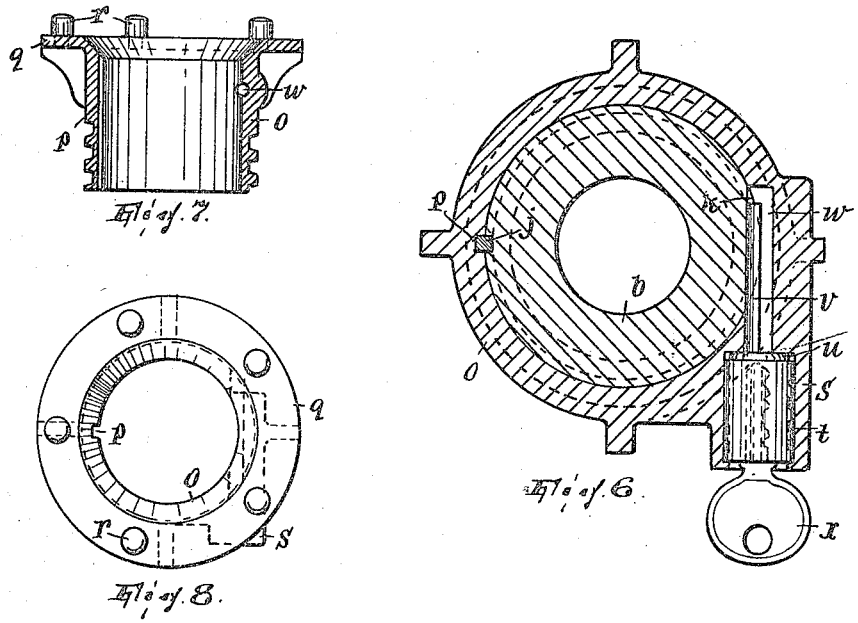
WITNESS:
Wm. Bell.
INVENTOR,
H. Lund Smith,
BY
John Sward
ATTORNEY

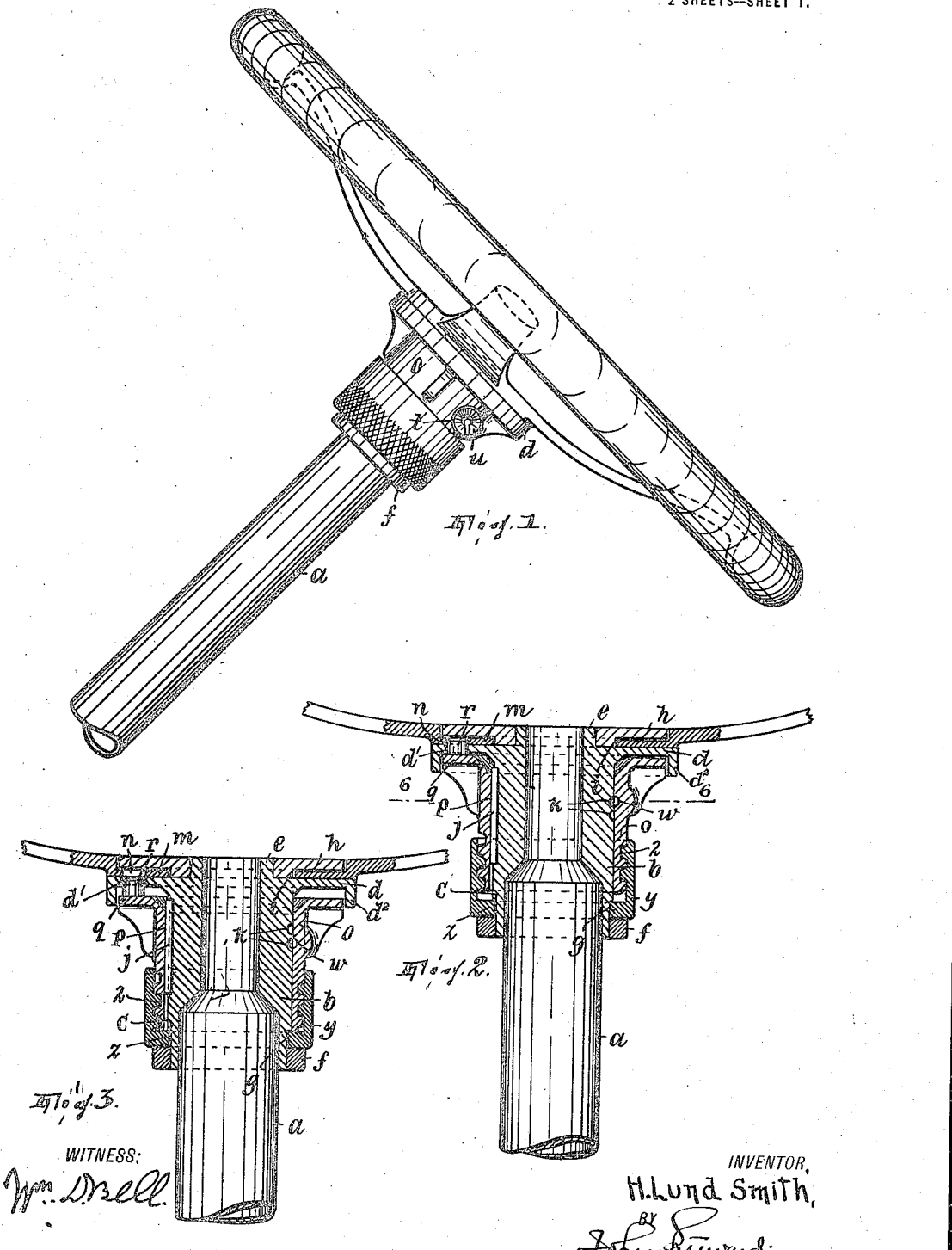

UNITED STATES PATENT OFFICE.

HENRY LUND SMITH, OF PATERSON, NEW JERSEY.

STEERING-WHEEL LOCK FOR VEHICLES.

1,423,632. Specification of Letters Patent. Patented July 25, 1922.

Application filed September 21, 1920. Serial No. 411,723.

*To all whom it may concern:*

Be it known that I, HENRY LUND SMITH, a citizen of the United States, residing at Paterson, in the county of Passaic and State of New Jersey, have invented certain new and useful Improvements in Steering-Wheel Locks for Vehicles, of which the following is a specification.

This invention relates to means for preventing the theft or unauthorized use of automobiles and particularly to that type of such means which affords a disconnective connection between the steering-wheel and steering-post, whereby the vehicle cannot be safely driven when the connection is disestablished, although it can be moved short distances, as by pushing it from one place to another. My invention contemplates, as a simple, effective and compact disconnective connecting means between the steering-wheel or handle member and the steering-post member, the employment of a splined clutch-collar and a nut to move it into and out of clutch engagement. My invention further contemplates the combination with a clutch member to disconnectively connect the steering-wheel and handle members of means to lock said clutch member in one or the other of the two positions where it interconnects or leaves unconnected the steering-post and handle members, by which arrangement the locking means plays no part in the actual locking or coupling of said members together and so a form of lock can be used that represents little if any departure from some standard type of lock and is small and compact and can therefore be built into and so produce compactness in the structure as a whole.

In the accompanying drawings,

Figure 1 is a side elevation of a steering-post and steering-wheel of an automobile embodying my invention;

Figures 2 and 3 are vertical sectional views of what is shown in Figure 1, the connection between the steering-post and steering-wheel members being shown respectively established and disestablished;

Figure 4 is a top plan, partly in section, of what is shown in Figure 1;

Figure 5 is an underneath plan of what I hereinafter term the steering-post member and steering-wheel;

Figure 6 is a section on line 6—6, Figure 2; and

Figures 7 and 8 are a vertical sectional and a top plan view of what I term the clutch-collar member or clutch member.

$a$ designates the steering-post of an automobile.

Adapted to be secured on the post $a$ in non-rotating relation thereto is a head (which, since it is fixed to and hence is virtually a part of the post, I hereinafter term the steering-post member) constructed as follows in the example illustrated: The body part $b$ of this head is a cylindrical bushing fitted over and fixed, as by being pinned, to the post $a$, and having its lower end circumferentially reduced, thereby producing a shoulder $c$, and near its upper end a laterally extending flange $d$ and its said upper end reduced to form a low-lying boss $e$; on this body part and over its reduced lower end is fitted and fixed, as by brazing, a collar $f$ which form a groove $g$ with the shoulder $c$, and over its boss $e$ is fitted and fixed, as by brazing, a disk $h$, which is rabbeted on the under side so as to produce a groove $i$. Body part $b$ is further provided with an exterior longitudinal feather $j$, and also with exterior transverse half-round grooves $k$ (Figs. 2, 3 and 6) set one above the other.

The hub-portion of the steering-wheel, which I hereinafter term the handle member, has an interior flange $m$ which occupies the groove $i$, so that a bearing or journal between the steering-post and handle members is thus formed, it being understood that the disk is brazed in place after the assembling of the parts involved. The flange $m$ of the handle member is provided with a suitable member of holes or recesses $n$ arranged, preferably equidistantly, around its axis.

On the body part $b$ of the aforesaid steering-post member is fitted a clutch member which is preferably a collar $o$ having a groove $p$ receiving the feather $j$ and at the top a flange $q$ equipped with upstanding pins $r$ arranged in holes $d'$ in the flange $d$, so that the clutch member is splined to the steering-post member, being capable of sliding but incapable of turning therein. The pins $r$ are adapted to register with and fit in the holes $n$ of the handle member when the pins and holes register. When the clutch member is elevated or depressed, so that its pins enter or are withdrawn from the holes $n$, the handle and steering-post members will be obviously interconnected or released from each other.

For locking the clutch member in either of these positions I provide the clutch member with a tangential housing $s$, cast therein, in which is arranged the casing $t$ of a barrel lock whose barrel $u$ rotates on an axis transverse to that of the steering-post and has an eccentric half-round extension-spindle or bolt $v$ revoluble in a bore $w$ in the clutch member when one or the other of the grooves $k$ of the steering post member registers with said bore; the mechanism of the lock is controlled by the key $x$ in some way characteristic of a well-known type of barrel lock wherein the barrel thereof is normally held against turning but may be turned upon insertion of the proper key, but this mechanism is not material as to its details to the present invention. When the bolt is turned clear of member $b$ the clutch member is free to be moved up or down; when the clutch member has thus been moved to the limit in either direction, which will bring one or the other of the grooves $k$ in register with bore $w$, it may be locked in that position upon imparting a half-turn to the bolt, so that it occupies said groove $k$ (see Figs. 2 and 3).

For moving the clutch member up or down I provide the nut $y$, which has an internal flange $z$ engaged in the groove $q$ of the steering-post member and a coarse screw-thread connection 2 with the clutch member. The nut is preferably milled externally to afford a good hand-grip in turning it.

It will be apparent that the form and arrangement of the parts are such as not only to prevent a steerable vehicle provided with the device from being stolen or used by an unauthorized person but to afford a construction which is simple, substantial, compact and efficient and in which the movement of the clutch member, when once unlocked, may be effected in a quick and facile manner. The feather and groove connection $j, p$ is designed to insure the registry of the pins $r$ with holes $d'$ should the pins, through wear of the parts, descend so far as to clear the holes, it being understood that I have provided flange $d$ not only to afford a bearing support for the steering-wheel but to provide a part to which the rotary thrust of the wheel would be directly imparted at several points, thereby promoting strength and stability.

Flange $d$ has a depending lip $d^2$ closely embracing the upper end of the clutch member which prevents admission of an implement that in an attempt to tamper with the device would injure it, it being noted that whereas a close (bearing) contact is possible between flange $d$ and the wheel it is not in practice possible to avoid a crevice existing between the flange and the top of the clutch member at least when the latter is depressed.

Having thus fully described my invention, what I claim and desire to secure by Letters Patent is:

1. In combination, a vehicle steering-post member having a lateral bearing flange, a steering wheel revolubly seated on the flange, a clutch member having a clutching portion forming a spline-connection with the flange and being movable up and down on said steering-post member into and out of locking engagement with the wheel, and means to hold the clutch member in its elevated position.

2. In combination, a vehicle steering-post member having a lateral bearing flange, a steering wheel revolubly seated on the flange, a clutch member having a clutching portion forming a spline-connection with the flange and being movable up and down on said steering-post member into and out of locking engagement with the wheel, and means to hold the clutch member in its elevated position, said flange having a lip depending below and closely embracing the upper end of the clutch member.

In testimony whereof I affix my signature.

HENRY LUND SMITH.